US012789917B2

(12) United States Patent
Jung et al.

(10) Patent No.: US 12,789,917 B2
(45) Date of Patent: Nov. 10, 2026

(54) JOINT STRUCTURE OF VEHICLE BODY

(71) Applicants: HYUNDAI MOTOR COMPANY, Seoul (KR); Kia Corporation, Seoul (KR)

(72) Inventors: Jae Hoon Jung, Pyeongtaek-si (KR); Seokju Gim, Seongnam-si (KR); Bong Guen Kwon, Seoul (KR); Songjae Jeong, Seongnam-si (KR); Sea Cheoul Song, Suwon-si (KR); Sun Hyung Cho, Suwon-si (KR); Sang Kyoung Han, Gunpo-si (KR); Jaeha Shim, Goyang-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 366 days.

(21) Appl. No.: 18/368,958

(22) Filed: Sep. 15, 2023

(65) Prior Publication Data

US 2024/0190519 A1 Jun. 13, 2024

(30) Foreign Application Priority Data

Dec. 13, 2022 (KR) ........................ 10-2022-0173429

(51) Int. Cl.

| | |
|---|---|
| ***B62D 27/06*** | (2006.01) |
| ***B62D 25/02*** | (2006.01) |
| ***B62D 25/06*** | (2006.01) |
| ***B62D 25/08*** | (2006.01) |
| ***B62D 25/20*** | (2006.01) |

(52) U.S. Cl.
CPC ............. *B62D 27/06* (2013.01); *B62D 25/02* (2013.01); *B62D 25/06* (2013.01); *B62D 25/08* (2013.01); *B62D 25/2009* (2013.01)

(58) Field of Classification Search
CPC .... B62D 27/06; B62D 27/023; B62D 27/065; B62D 25/02; B62D 25/06; B62D 25/08; B62D 25/2009; B62D 63/025
USPC ..................... 296/26.8, 193.04, 5, 8, 9, 35.3
See application file for complete search history.

(56) References Cited

U.S. PATENT DOCUMENTS 2,425,948 A * 8/1947 Lucien ................. B62D 31/025 296/193.03
2,678,231 A * 5/1954 Barenyi ................. B62D 25/24 296/193.03
4,842,326 A * 6/1989 DiVito ...................... B60P 3/42 296/10
4,995,664 A * 2/1991 Buday ....................... B60P 3/32 296/165
5,108,144 A * 4/1992 Crowley .................. B60P 3/32 296/168
6,129,411 A * 10/2000 Neff .......................... B60P 3/42 296/193.03

(Continued)

FOREIGN PATENT DOCUMENTS

CN 118597274 A * 9/2024 ........... B62D 63/025
KR 10-2014-0004384 A 1/2014

*Primary Examiner* — Patricia L Engle
(74) *Attorney, Agent, or Firm* — Morgan, Lewis & Bockius LLP

(57) ABSTRACT

A joint structure of a vehicle body includes a front body module connected to a front portion of an under body, a rear body module connected to a rear portion of the under body, and an engage unit that detachably engages the front body module and the rear body module.

20 Claims, 9 Drawing Sheets

(56) References Cited

U.S. PATENT DOCUMENTS

| | | | | |
|---|---|---|---|---|
| 8,226,144 | B2 * | 7/2012 | Sheikhha | B62D 25/00 296/26.08 |
| 10,780,930 | B1 * | 9/2020 | Kentley-Klay | B62B 3/0612 |
| 11,097,790 | B2 * | 8/2021 | Schwalbe | B62D 65/02 |
| 2008/0169680 | A1 | 7/2008 | Hedderly | |
| 2020/0114995 | A1 * | 4/2020 | Anderson | B62D 31/025 |
| 2020/0189378 | A1 * | 6/2020 | Hirsch | B60L 50/64 |
| 2024/0190519 | A1 * | 6/2024 | Jung | B62D 27/06 |
| 2024/0383342 | A1 * | 11/2024 | Kwon | H01M 50/249 |
| 2025/0187677 | A1 * | 6/2025 | Shim | B62D 25/2027 |

* cited by examiner

JOINT STRUCTURE OF VEHICLE BODY

CROSS-REFERENCE TO RELATED APPLICATION

The present application claims priority to Korean Patent Application No. 10-2022-0173429 filed on Dec. 13, 2022, the entire contents of which is incorporated herein for all purposes by this reference.

BACKGROUND OF THE PRESENT DISCLOSURE

Field of the Present Disclosure

The present disclosure relates to a vehicle body. More particularly, the present disclosure relates to a joint structure of a vehicle body of a Purpose Built Vehicle (PBV).

Description of Related Art

Recently, the vehicle industry is introducing a new concept of future mobility vision for realizing a human-centered, dynamic future city. One of these future mobility solutions is a Purpose Built Vehicle (PBV) as purpose-based mobility.

A PBV may be an example of an electric vehicle (EV)-based environment-friendly mobile vehicle. The present PBV can provide various customized services to users while moving from the starting point to the destination in an unmanned autonomous driving method.

The vehicle body of such a PBV is composed of an under body (also referred to as a rolling chassis or a skateboard in the art) and an upper body assembled to the under body.

Here, the upper body may be configured in various forms according to the type of customized service of PBV. For example, the PBV may be used as a hailing type vehicle having cabins respectively configured in the front and rear parts of the upper body. Furthermore, the PBV may be used as a cab type vehicle in which a cabin is configured only in the front portion of the upper body. Furthermore, the PBV may be used as a delivery type vehicle in which a cabin is configured in the front part of the upper body and a luggage compartment is configured in the rear part.

As described above, the cost of changing the structure of the upper body may increase according to various customized services of the PBV vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a joint structure of a vehicle body which may be replaced with various types of vehicle bodies according to the type of customized service of PBV.

A joint structure of a vehicle body according to various exemplary embodiments of the present disclosure may include a front body module connected to a front portion of an under body, a rear body module connected to a rear portion of the under body, and an engage unit that detachably engages the front body module and the rear body module.

The front body module may include a front side structure, a front roof structure, and a front floor structure.

The rear body module may include a rear roof structure, a rear floor structure and a rear side structure to which the ear roof structure and the rear floor structure are connected.

The engage unit may engage the front side structure and the rear side structure along a front to rear direction of the vehicle body.

The engage unit may engage the front roof structure and the rear roof structure along the front to rear direction of the vehicle body.

The engage unit may engage the front floor structure and the rear floor structure along the front to rear direction of the vehicle body.

The front side structure may include a front side internal panel, a front side reinforcement panel, a front side external panel, and a first front mounting reinforcement member connected between the front side internal panel and the front side reinforcement panel.

The rear side structure may include a rear side internal panel, a rear side reinforcement panel, a rear side external panel, and a first rear mounting reinforcement member connected between the rear side internal panel and the rear side reinforcement panel.

The engage unit may include a first guide pipe connected to the rear side reinforcement panel and the first rear mounting reinforcement member along the front to rear direction of the vehicle body, a first pipe nut connected to the front side internal panel and the first front mounting reinforcement member along the front to rear direction of the vehicle body, a first engage bolt connected to the first guide pipe along the front to rear direction of the vehicle body, and engaged to the first pipe nut, and a first rubber bush located between the first guide pipe and the first pipe nut.

A first sealing member may be connected to a rear connection portion to which the front side internal panel, the front side reinforcement panel, the front side external panel, and the first front mounting reinforcement member are connected to each other.

A second sealing member may be connected to a front connection portion to which the rear side internal panel, the rear side reinforcement panel, and the first rear mounting reinforcement member are connected to each other.

First molding mounting portions may be formed along the vertical direction on the front side external panel and the rear side external panel connected along the front to rear direction of the vehicle body.

A first molding member configured to seal between the front side structure and the rear side structure may be connected to the first molding mounting portions.

The front roof structure may include a front roof rail member and a front roof panel connected to each other, and a second front mounting reinforcement member connected to the front roof rail member.

The rear roof structure may include a rear roof rail lower, a rear roof rail upper, and a rear roof panel connected to each other, and a second rear mounting reinforcement member connected between the rear roof rail lower and the rear roof rail upper.

The engage unit may include a second guide pipe connected to the rear roof rail upper and the second rear mounting reinforcement member along the front to rear direction of the vehicle body, a second pipe nut connected to the front roof rail member and the second front mounting reinforcement member along the front to rear direction of the vehicle body, a second engage bolt connected to the second guide pipe and engaged with the second pipe nut, and a second rubber bush located between the second guide pipe and the second pipe nut.

A third sealing member may be connected to a rear connection portion to which the front roof rail member and the front roof panel are connected to each other.

A fourth sealing member may be connected to a front connection portion, to which the rear roof rail lower, the rear roof rail upper, and the second rear mounting reinforcement member are connected to each other.

Second molding mounting portions may be formed on the front roof panel and the rear roof panel connected along the front to rear direction of the vehicle body.

A second molding member configured to seal between the front roof structure and the rear roof structure may be connected to the second molding mounting portions.

The front floor structure may include a front cross member lower, a front cross member upper, a front floor panel, and a third front mounting reinforcement member connected between the front cross member lower and the front cross member upper The rear floor structure may include a rear cross member, a rear floor panel, and a third rear mounting reinforcement member connected between the rear cross member and the rear floor panel.

The engage unit may include a third guide pipe connected to the rear cross member and the third rear mounting reinforcement member along the front to rear direction of the vehicle body, a third pipe nut connected to the front cross member upper and the third front mounting reinforcement member along the front to rear direction of the vehicle body, a third engage bolt connected to the third guide pipe and engaged with the third pipe nut, and a third rubber bush located between the third guide pipe and the third pipe nut.

A fifth sealing member may be connected to a rear connection portion to which the front cross member lower, the front cross member upper, and the third front mounting reinforcement member are connected to each other;

A sixth sealing member may be connected to a front connection portion to which the rear cross member, the rear floor panel, and the third rear mounting reinforcement member are connected to each other.

The engage unit may engage the front side structure and the rear side structure in a horizontal direction along the vehicle width direction.

The engage unit may engage the front side structure and the rear side structure in an oblique direction along the vehicle width direction.

The front body module may be a fixed portion fixed to the front portion of the under body.

The rear body module may include a predetermined shape and is a detachable variable portion to the rear portion of the under body and the front body module.

According to exemplary embodiments of the present disclosure, cost reduction may be achieved by changing the upper body structure of the vehicle body to suit various customized services of PBV.

Furthermore, the effects which may be obtained or predicted due to the exemplary embodiments of the present disclosure will be directly or implicitly included in the detailed description of the exemplary embodiments of the present disclosure. That is, various effects expected according to various exemplary embodiments of the present disclosure will be included within the detailed description to be described later.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
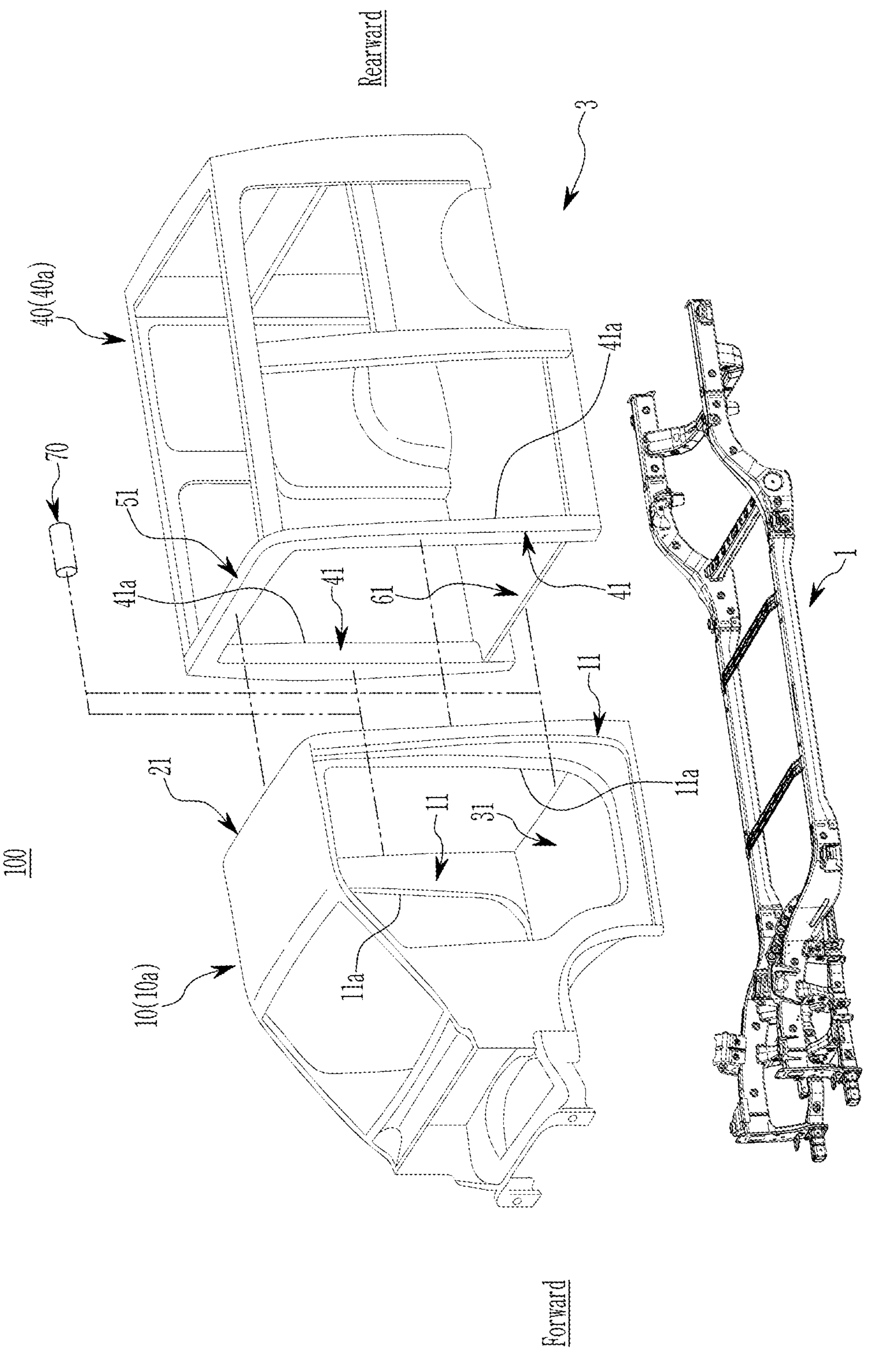
FIG. 1 is an exploded perspective view showing a joint structure of a vehicle body according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

The terminology used herein is for describing specific exemplary embodiments only, and is not intended to limit the present disclosure. As used herein, the singular forms are intended to include the plural forms as well, unless the context clearly indicates otherwise.

The terms 'comprises' and/or 'comprising' as used herein indicate the presence of specified features, integers, steps, operations, elements and/or components, but not one or more other features, integers, steps, or steps. It should also be understood that it does not exclude the presence or addition of one or more other features, integers, steps, operations, components, and/or groups thereof.

As used in the present specification, the term 'and/or' includes any one or all combinations of at least one of the associated listed items.

In the present specification, the term 'connected' indicates that a physical relationship between two components, for example, in which components are directly connected to each other by welding, self piercing rivet (SPR), flow drill screw (FDS), structural adhesive, or the like, or components that are indirectly connected through one or more intermediate components.

As used herein, 'vehicle', 'vehicular', 'automotive' or other similar terms as used herein generally refer to passenger vehicles, sports cars, sports utility vehicles (SUVs), buses, trucks, and various commercial vehicles including passenger vehicles, hybrid vehicles, electric vehicles, hybrid electric vehicles, electric vehicle-based Purpose Built vehicles (PBVs), hydrogen-powered vehicles and other alternative fuel powered vehicles (e.g., fuel derived from resources other than petroleum fuel).

Hereinafter, embodiments of the present disclosure will be described in detail with reference to the accompanying drawings.

Figure 2:
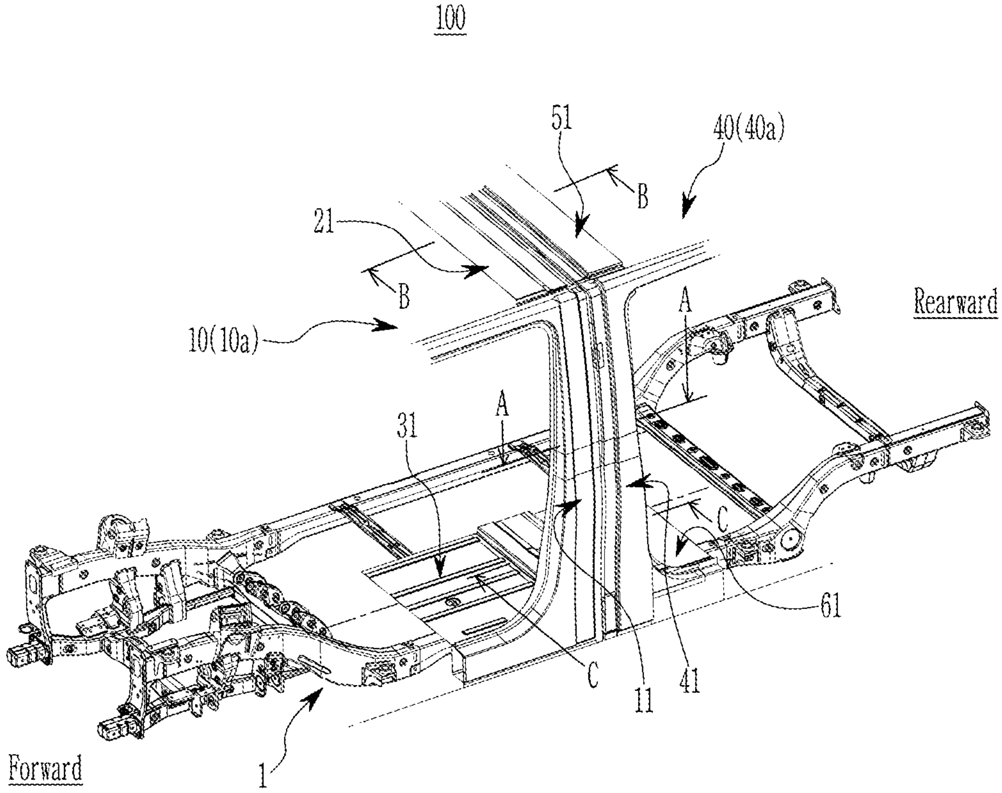
FIG. 2 is a partial perspective view showing a joint structure of a vehicle body according to an exemplary embodiment of the present disclosure.

FIG. 1 is an exploded perspective view showing a joint structure of a vehicle body according to an exemplary embodiment of the present disclosure, and FIG. 2 is a partial perspective view showing a joint structure of a vehicle body according to an exemplary embodiment of the present disclosure.

Referring to FIG. 1 and FIG. 2, a joint structure of a vehicle body 100 according to various exemplary embodiments of the present disclosure may be applied to, for example, a vehicle body of a purpose-based mobility vehicle (Purpose Built Vehicle: hereinafter referred to as a 'PBV').

In one example, the PBV may be used as an electric vehicle-based life module vehicle that provides various services to occupants while moving from one place to a destination in an unmanned self-driving manner.

The vehicle body of the PBV includes a skateboard type under body 1 (those skilled in the art are commonly referred to as a 'rolling chassis' or 'chassis frame') and an upper body 3 assembled to the under body 1.

Components such as a battery assembly and a drive motor may be mounted on the under body 1. The upper body 3 is a Body In White (BIW) body connected to the under body 1, and can form a cabin and luggage compartment with a wide indoor space.

The vehicle body of the PBV is suitable for small-volume production of various vehicle types with a small number of parts, and may be manufactured in various shapes and sizes.

In the present specification, the 'front to rear direction of the vehicle body' may be defined as the longitudinal direction of the vehicle body, the 'vehicle width direction' may be defined as the left and right direction of the vehicle body, and the 'up-and-down direction' may be defined as the height direction of the vehicle body.

In the present specification, 'upper end', 'upper portion', or 'upper surface' of a component indicates an end, portion, or surface of a component that is relatively upper in the drawing, and 'lower end', 'lower portion', or 'lower surface' of a component indicates an end, portion, or surface of a component that is relatively lower in the drawing.

Furthermore, in the present specification, an end portion of a component (e.g., one end portion or another (other) end, etc.) denotes an end portion of a component in any one direction, and an end portion of the component (e.g., one end portion) or other (another) end portion, etc.) denotes a portion of a component that includes that end.

The joint structure of a vehicle body 100 according to various exemplary embodiments of the present disclosure may be a structure that can apply various types of upper body 3 to under body 1 according to the type of customized service of PBV.

The joint structure of a vehicle body 100 according to an exemplary embodiment of the present disclosure includes a front body module 10 and a rear body module 40 as the upper body 3 assembled to the under body 1. The joint structure of a vehicle body 100 according to an exemplary embodiment of the present disclosure includes a plurality of engage units 70.

In an exemplary embodiment of the present disclosure, the front body module 10 is configured to form a cab type front cabin at the front of the vehicle body. The front body module 10 may be connected to the front portion of the under body 1.

The front body module 10 may be connected along a vertical direction to the front portion of the under body 1 through a vehicle body mounting unit known to a person of an ordinary skill in the art. The front body module 10 may be a fixed portion 10*a* fixed to the front portion of the under body 1.

The front body module 10 includes a front side structure 11, a front roof structure 21, and a front floor structure 31.

The front side structure 11 is provided on both sides of the front body module 10 along the vehicle width direction, and is disposed along the front to rear direction of the vehicle body. A front door mount opening 11*a* is formed in the front side structure 11.

The front roof structure 21 connects an upper portion of the front side structure 11 along the vehicle width direction. The front floor structure 31 is configured to connect a lower portion of the front side structure 11 along the vehicle width direction.

In an exemplary embodiment of the present disclosure, the rear body module 40 is configured to form a rear cabin or a luggage compartment at the rear of the vehicle body. The rear body module 40 may be connected to the rear portion of the under body 1.

The rear body module 40 may be connected to the rear portion of the under body I along a vertical direction. The rear body module 40 may be a variable portion 40*a* detachable to or from the front body module 10 in a predetermined shape.

The rear body module 40 may be a rear cabin provided at the rear of the vehicle body 100, and may be connected to the under body 1 forming an upper body 3 of a hailing type together with the front body module 10.

Furthermore, the rear body module 40 may be a luggage compartment provided at the rear of the vehicle body, and may be connected to the under body 1 forming a delivery type upper body 3 together with the front body module 10.

The rear body module 40 includes a rear side structure 41, a rear roof structure 51, and a rear floor structure 61.

The rear side structure 41 is provided on both sides of the rear body module 40 along the vehicle width direction, respectively, and is disposed along the front to rear direction of the vehicle body. At least one rear door mount opening 41*a* is formed in the rear side structure 41.

The rear roof structure 51 is configured to connect the upper portion of the rear side structure 41 along the vehicle width direction. The rear floor structure 61 is configured to connect the lower portion of the rear side structure 41 along the vehicle width direction.

In an exemplary embodiment of the present disclosure, the plurality of engage units 70 are configured to engage the front body module 10 and the rear body module 40.

The plurality of engage units 70 are configured to engage the front side structure 11 of the front body module 10 and the rear side structure 41 of the rear body module 40 along the front to rear direction of the vehicle body. Furthermore, the plurality of engage units 70 are configured to engage the front roof structure 21 of the front body module 10 and the rear roof structure 51 of the rear body module 40 along the front to rear direction of the vehicle body. Furthermore, the plurality of engage units 70 are configured to engage the front floor structure 31 of the front body module 10 and the rear floor structure 61 of the rear body module 40 along the front to rear direction of the vehicle body.

Hereinafter, the configuration of the front side structure 11, the front roof structure 21, and the front floor structure 31 of the front body module 10, and the rear side structure 41, the rear roof structure 51, and the rear floor structure 61 of the rear body module 40 will be explained in detail with reference to the accompanying drawing.

Furthermore, hereinafter, the configuration of the plurality of engage units 70 and the combined structure of the front body module 10 and the rear body module 40 engaged by the plurality of engage units 70 will be described in detail with reference to accompanying drawings.

Figure 3:
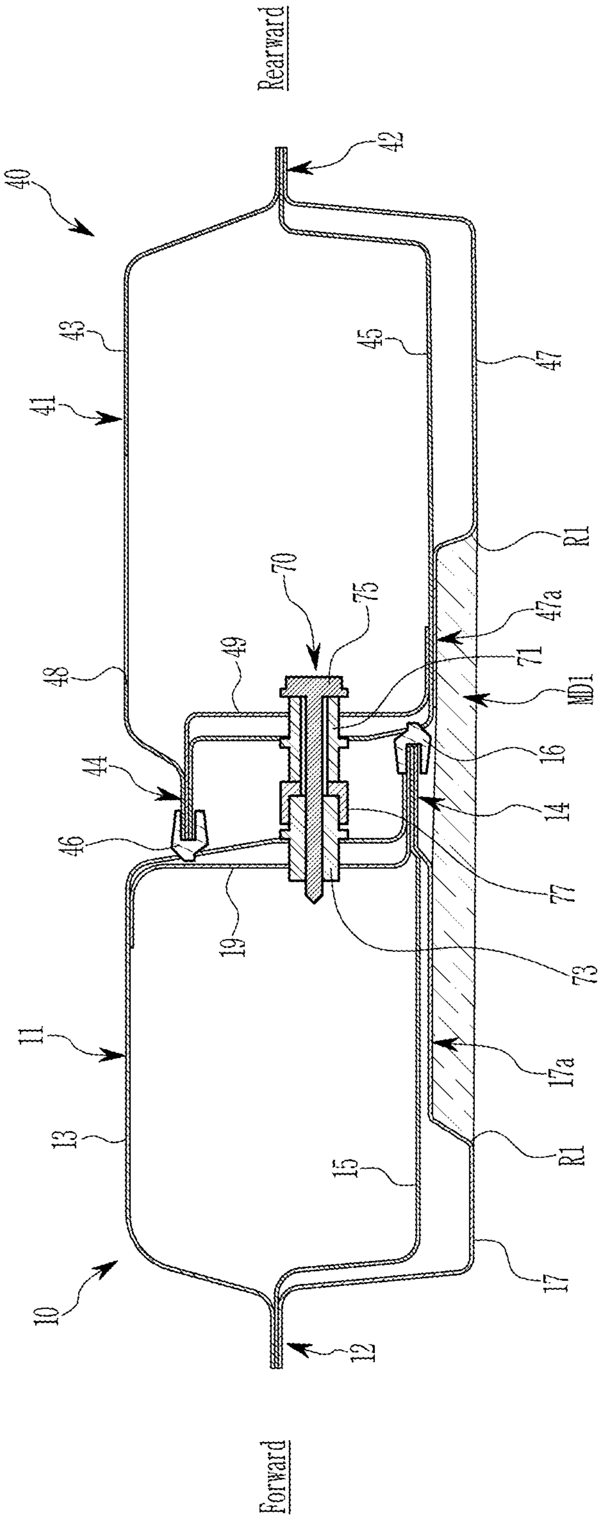
FIG. 3 is a cross-sectional view along line A-A in FIG. 2.

FIG. 3 is a cross-sectional view along line A-A in FIG. 2.

Referring to FIG. 1 to FIG. 3, the front side structure 11 of the front body module 10 according to an exemplary embodiment of the present disclosure includes a front side internal panel 13, a front side reinforcement panel 15, a front side external panel 17, and a first front mounting reinforcement member 19 connected to each other.

The front side internal panel 13 and the front side external panel 17 may be connected to the front side reinforcement panel 15 by welding along the vehicle width direction with the front side reinforcement panel 15 interposed therebetween.

A front connection portion 12 in which the front side internal panel 13, the front side reinforcement panel 15, and the front side external panel 17 are connected to each other in the instant way may function as a flange of the aforementioned front door mount opening 11*a*.

The first front mounting reinforcement member 19 reinforces the strength of the rear portion of the front side structure 11. The first front mounting reinforcement member 19 may be connected between the front side internal panel 13 and the front side reinforcement panel 15 by welding.

The front side structure 11 further includes a first sealing member 16. The first sealing member 16 may be connected to a rear connection portion 14 in which the front side internal panel 13, the front side reinforcement panel 15, the front side external panel 17, and the first front mounting reinforcement member 19 are connected to each other. In an exemplary embodiment of the present invention, the first sealing member 16 may include a rubber material weather strip.

Referring to FIG. 1. to FIG. 3, the rear side structure 41 of the rear body module 40 according to an exemplary embodiment of the present disclosure includes a rear side internal panel 43, a rear side reinforcement panel 45, a rear side external panel 47, and a first rear mounting reinforcement member 49 connected to each other.

The rear side internal panel 43 and the rear side external panel 47 may be connected to the rear side reinforcement panel 45 by welding along the vehicle width direction with the rear side reinforcement panel 45 interposed therebetween.

A rear connection portion 42 in which the rear side internal panel 43, the rear side reinforcement panel 45, and the rear side external panel 47 are connected to each other in the instant way may function as a flange of the aforementioned of at least one rear door mount opening 41*a*.

The first rear mounting reinforcement member 49 reinforces the strength of the front portion of the rear side structure 41. The first rear mounting reinforcement member 49 may be connected between the rear side internal panel 43 and the rear side reinforcement panel 45 by welding.

The rear side structure 41 further includes a second sealing member 46. The second sealing member 46 may be connected to a front connection portion 44 to which the rear side internal panel 43, the rear side reinforcement panel 45, and the first rear mounting reinforcement member 49 are connected to each other. In one example, the second sealing member 46 may include a rubber material weather strip.

Referring to FIG. 1 to FIG. 3, the plurality of engage units 70 according to various exemplary embodiments of the present disclosure may engage the front side structure 11 of the front body module 10 and the rear side structure 41 of the rear body module 40 along the front to rear direction of the vehicle body.

Figure 4:
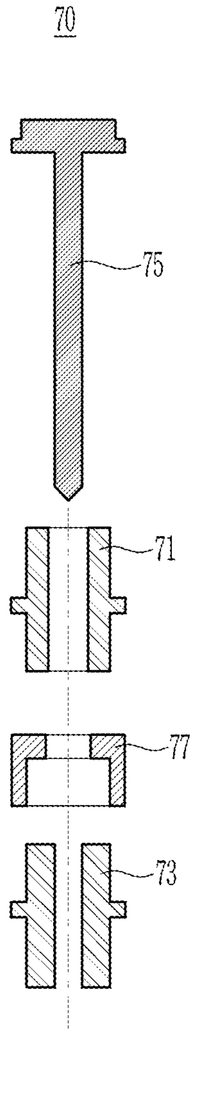
FIG. 4 is an exploded view showing an engage unit applied to a joint structure of a vehicle body according to an exemplary embodiment of the present disclosure.
Figure 5:
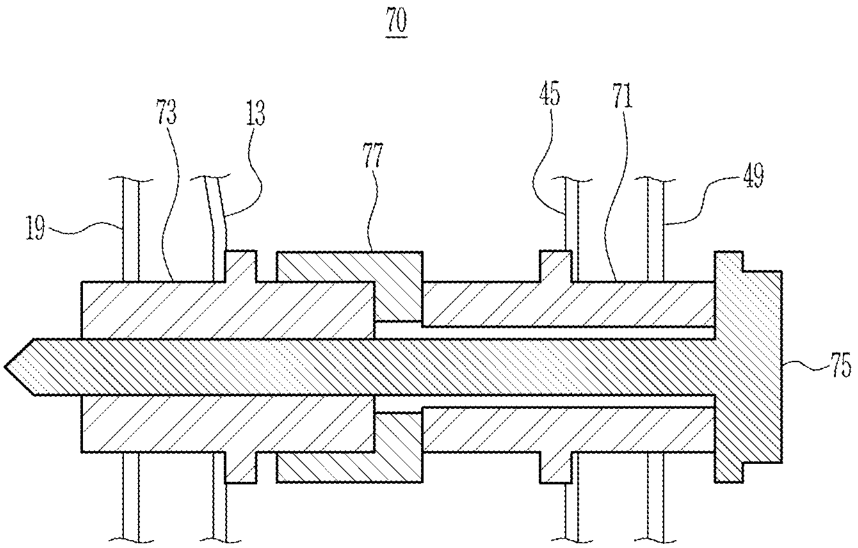
FIG. 5 is a cross-sectional view showing an engage unit applied to a joint structure of a vehicle body according to an exemplary embodiment of the present disclosure.

FIG. 4 is an exploded view showing an engage unit applied to a joint structure of a vehicle body according to an exemplary embodiment of the present disclosure, and FIG. 5 is a cross-sectional view showing an engage unit applied to a joint structure of a vehicle body according to an exemplary embodiment of the present disclosure.

Referring to FIG. 1 to FIG. 5, each of the engage units 70 includes a first guide pipe 71, a first pipe nut 73, a first engage bolt 75, and a first rubber bush 77.

The first guide pipe 71 may be a hollow cylindrical pipe. The first guide pipe 71 is connected to the rear side reinforcement panel 45 and the first rear mounting reinforcement member 49 along the front to rear direction of the vehicle body at the front of the rear side structure 41.

The first guide pipe 71 is provided to penetrate the rear side reinforcement panel 45 and the first rear mounting reinforcement member 49 along the front to rear direction of the vehicle body, and may be joined to the rear side reinforcement panel 45 and the first rear mounting reinforcement member 49 by welding (e.g., CO2 welding or projection welding).

The first pipe nut 73 may be a hollow cylinder. The first pipe nut 73 is connected to the front side internal panel 13 and the first front mounting reinforcement member 19 along the front to rear direction of the vehicle body at the rear of the front side structure 11.

The first pipe nut 73 is provided to penetrate the front side internal panel 13 and the first front mounting reinforcement member 19 along the front to rear direction of the vehicle body at a position corresponding to the first guide pipe 71, and may be joined to the front side internal panel 13 and the first front mounting reinforcement member 19 by welding (e.g., CO2 welding or projection welding).

The first engage bolt 75 is connected to the first guide pipe 71 along the front to rear direction of the vehicle body, and is engaged to the first pipe nut 73. The first engage bolt 75 may be connected to the first guide pipe 71 along the front to rear direction of the vehicle body through a first bolt passing hole 48 formed in the rear side internal panel 43 of the rear side structure 41.

The first rubber bush 77 prevents noise caused by direct contact between the first guide pipe 71 and the first pipe nut 73 when the first engage bolt 75 is engaged to the first pipe nut 73 through the first guide pipe 71. The first rubber bush 77 may absorb the coupling tolerance in the front to rear direction of the vehicle body of the front side structure 11 and the rear side structure 41 which are engaged with each other by the first engage bolt 75.

The first rubber bush 77 is located between the first guide pipe 71 and the first pipe nut 73. The first rubber bush 77 includes a cylinder shape and is connected to the first pipe nut 73.

One portion of the first rubber bush 77 is engaged onto the first pipe nut 73, and the other portion of the first rubber bush 77 comes into contact with the first guide pipe 71.

As described above, in the front side structure 11 and the rear side structure 41 engaged by the plurality of engage units 70, first molding mounting portions 17*a*, and 47*a* are formed to the front side external panel 17 and the rear side external panel 47 connected along the front to rear direction of the vehicle body.

The first molding mounting portion 17*a*, and 47*a* are formed along the vertical direction, and may be formed in the form of concave forming portions on the front side external panel 17 and the rear side external panel 47 along the vehicle width direction.

A first molding member MDI is connected to the first molding mounting portions 17*a* and 47*a*. The first molding member MDI is configured to seal between the front side structure 11 and the rear side structure 41 engaged by the plurality of engage units 70.

In one example, the first molding member MDI may be formed of a rubber material. In another example, the first molding member MDI may be inserted into the first molding mounting portions 17*a* and 47*a* and attached to the first molding mounting portions 17*a* and 47*a* through an adhesive. A first molding ribs RI are formed at both end portions of the first molding member MDI along the front to rear direction of the vehicle body.

Figure 6:
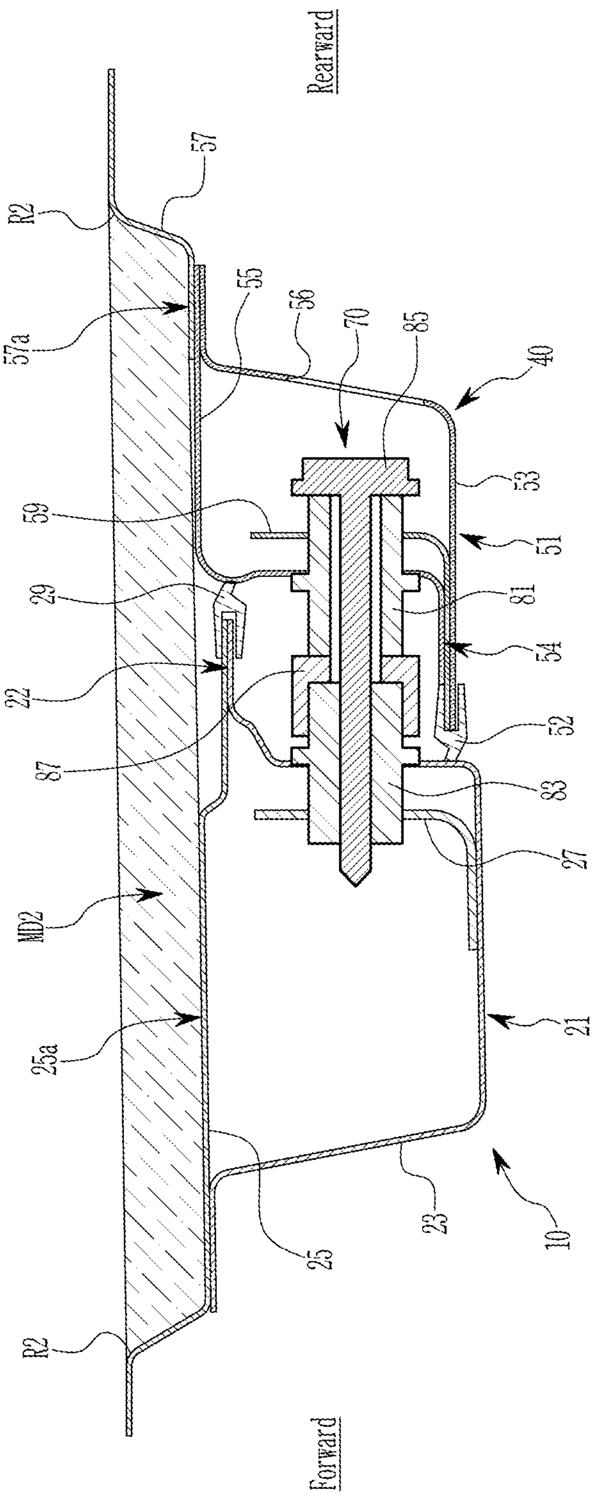
FIG. 6 is a cross-sectional view along the B-B line in FIG. 2.

FIG. 6 is a cross-sectional view along the B-B line in FIG. 2.

Referring to FIG. 1, FIG. 2, and FIG. 6, the front roof structure 21 of the front body module 10 according to an exemplary embodiment of the present disclosure includes a front roof rail member 23, a front roof panel 25, and a second front mounting reinforcement member 27 connected to each other.

The front roof rail member 23 is disposed along the vehicle width direction to connect the upper portion of the front side structure 11, and is connected to the upper portion of the front side structure 11 by welding. The front roof panel 25 is connected to the upper portion of the front roof rail member 23 by welding.

The second front mounting reinforcement member 27 reinforces the strength of the rear portion of the front roof structure 21. The second front mounting reinforcement member 27 may be connected to the front roof rail member 23 between the front roof rail member 23 and the front roof panel 25 by welding.

The front roof structure 21 further includes a third sealing member 29. The third sealing member 29 may be connected to a rear connection portion 22 in which the front roof rail member 23 and the front roof panel 25 are connected to each other. In one exemplary embodiment of the present disclosure, the third sealing member 29 may include a rubber material weather strip.

Referring to FIG. 1, FIG. 2, and FIG. 6, the rear roof structure 51 of the rear body module 40 according to an exemplary embodiment of the present disclosure includes a rear roof rail lower 53, a rear roof rail upper 55, a rear roof panel 57, and a second rear mounting reinforcement member 59 connected to each other.

The rear roof rail lower 53 is disposed along the vehicle width direction to connect the upper portion of the rear side structure 41, and is connected to the upper portion of the rear side structure 41 by welding.

The rear roof rail upper 55 is connected to the upper portion of the rear roof rail lower 53 by welding. The rear roof panel 57 is welded to the upper portion of the rear roof rail upper 55.

The second rear mounting reinforcement member 59 reinforces the strength of the front portion of the rear roof structure 51. The second rear mounting reinforcement member 59 may be connected between the rear roof rail lower 53 and the rear roof rail upper 55 by welding.

The rear roof structure 51 further includes a fourth sealing member 52. The fourth sealing member 52 may be connected to a front connection portion 54 in which the rear roof rail lower 53, the rear roof rail upper 55, and the second rear mounting reinforcement member 59 are connected to each other. In an exemplary embodiment of the present invention, the fourth sealing member 52 may include a rubber material weather strip.

Referring to FIG. 1, FIG. 2, and FIG. 6, a plurality of engage units 70 according to various exemplary embodiments of the present disclosure may engage the front roof structure 21 of the front body module 10 and the rear roof structure 51 of the rear body module 40 along the front to rear direction of the vehicle body.

The plurality of engage units 70 includes a second guide pipe 81, a second pipe nut 83, a second engage bolt 85, and a second rubber bush 87.

The second guide pipe 81 may be a hollow cylindrical pipe. The second guide pipe 81 is connected to the rear roof rail upper 55 and the second rear mounting reinforcement member 59 along the front to rear direction of the vehicle body at the front of the rear roof structure 51.

The second guide pipe 81 is provided to penetrate the rear roof rail upper 55 and the second rear mounting reinforcement member 59 along the front to rear direction of the vehicle body, and is welded to the rear roof rail upper 55 and the second rear mounting reinforcement member 59 (e.g., CO2 welding or projection welding).

The second pipe nut 83 may be a hollow cylinder shape. The second pipe nut 83 is connected to the front roof rail member 23 and the second front mounting reinforcement member 27 along the front to rear direction of the vehicle body at the rear of the front roof structure 21.

The second pipe nut 83 is provided to penetrate the front roof rail member 23 and the second front mounting reinforcement member 27 along the front to rear direction of the vehicle body at a position corresponding to the second guide pipe 81, and is connected to the front roof rail member 23 and the second front mounting reinforcement member 27 by welding (e.g., CO2 welding or projection welding).

The second engage bolt 85 is connected to the second guide pipe 81 along the front to rear direction of the vehicle body, and is engaged to the second pipe nut 83. The second engage bolt 85 may be connected to the second guide pipe 81 along the front to rear direction of the vehicle body through a second bolt passing hole 56 formed to the rear roof rail lower 53 of the rear roof structure 51.

The second rubber bush 87 prevents noise caused by direct contact between the second guide pipe 81 and the second pipe nut 83 when the second engage bolt 85 engages the second pipe nut 83 through the second guide pipe 81. The second rubber bush 87 may absorb the coupling tolerance of the front roof structure 21 and the rear roof structure 51 engaged with each other by the second engage bolt 85 in the front to rear direction of the vehicle body.

The second rubber bush 87 is located between the second guide pipe 81 and the second pipe nut 83. The second rubber bush 87 includes a cylinder shape and is connected to the second pipe nut 83.

One portion of the second rubber bush 87 is engaged onto the second pipe nut 83, and the other portion of the second rubber bush 87 may be in contact with the second guide pipe 81.

On upper portion of the front roof structure 21 and the rear roof structure 51 engaged by the plurality of engage units 70, second molding mounting portions 25*a*, and 57*a* are formed on the front roof panel 25 and the rear roof panel 57 connected along the front to rear direction of the vehicle body.

The second molding mounting portions 25*a*, and 57*a*are formed along the vehicle width direction, and may be formed in the form of a concave forming portion along the vertical direction of the front roof panel 25 and the rear roof panel 57.

A second molding member MD2 is connected to the second molding mounting portions 25*a* and 57*a*. The second molding member MD2 is configured to seal between the front roof structure 21 and the rear roof structure 51 engaged by the plurality of engage units 70.

In an exemplary embodiment of the present disclosure, the second molding member MD2 may be formed of a rubber material. In another exemplary embodiment of the present disclosure, the second molding member MD2 may be inserted into the second molding mounting portions 25*a*, and 57*a*, and attached to the second molding mounting portions 25*a*, and 57*a* through an adhesive. Second molding ribs (molding ribs) R2 are formed at both end portions of the second molding member MD2 along the front to rear direction of the vehicle body.

Figure 7:
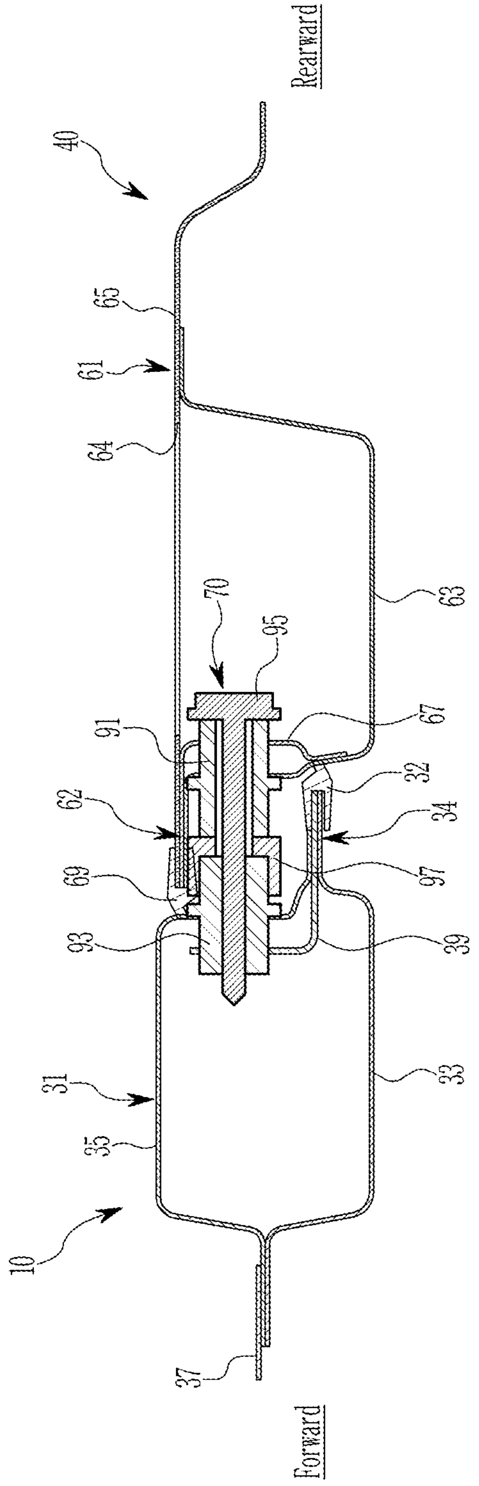
FIG. 7 is a cross-sectional view along the C-C line in FIG. 2.

FIG. 7 is a cross-sectional view along the C-C line in FIG. 2.

Referring to FIG. 1, FIG. 2, and FIG. 7, the front floor structure 31 of the front body module 10 according to an exemplary embodiment of the present disclosure includes a front cross member lower 33, a front cross member upper 35, a front floor panel 37, and a third front mounting reinforcement member 39 connected to each other.

The front cross member lower 33 is disposed along the vehicle width direction to connect the lower portion of the front side structure 11, and is connected to the lower portion of the front side structure 11 by welding.

The front cross member upper 35 is connected to the upper surface of the front cross member lower 33 by welding. The front floor panel 37 is connected to the upper portion of the front cross member upper 35 by welding.

The third front mounting reinforcement member 39 reinforces the strength of the rear portion of the front floor structure 31. The third front mounting reinforcement member 39 may be connected between the front cross member lower 33 and the front cross member upper 35 by welding.

The front floor structure 31 further includes a fifth sealing member 32. The fifth sealing member 32 may be connected to a rear connection portion 34 in which the front cross member lower 33, the front cross member upper 35, and the third front mounting reinforcement member 39 are connected to each other. In one exemplary embodiment of the present disclosure, the fifth sealing member 32 may include a rubber material weather strip.

Referring to FIG. 1, FIG. 2, and FIG. 7, the rear floor structure 61 of the rear body module 40 according to an exemplary embodiment of the present disclosure includes a rear cross member 63, a rear floor panel 65, and a third rear mounting reinforcement member 67 connected to each other.

The rear cross member 63 is disposed along the vehicle width direction to connect the lower portion of the rear side structure 41 and is connected to the lower portion of the rear side structure 41 by welding. The rear floor panel 65 is welded to the upper portion of the rear cross member 63.

The third rear mounting reinforcement member 67 reinforces the strength of the front portion of the rear floor structure 61. The third rear mounting reinforcement member 67 may be connected between the rear cross member 63 and the rear floor panel 65 by welding.

The rear floor structure 61 further includes a sixth sealing member 69. The sixth sealing member 69 may be connected to a front connection portion 62 in which the rear cross member 63, the rear floor panel 65, and the third rear mounting reinforcement member 67 are connected to each other. In one example, the sixth sealing member 69 may include a rubber material weather strip.

Referring to FIG. 1, FIG. 2, and FIG. 7, the plurality of engage units 70 according to various exemplary embodiments of the present disclosure may engage the front floor structure 31 of the front body module 10 and the rear floor structure 61 of the rear body module 40 along the front to rear direction of the vehicle body.

The plurality of engage units 70 includes a third guide pipe 91, a third pipe nut 93, a third engage bolt 95, and a third rubber bush 97.

The third guide pipe 91 may be a hollow cylindrical pipe. The third guide pipe 91 is connected to the rear cross member 63 and the third rear mounting reinforcement member 67 along the front to rear direction of the vehicle body at the front of the rear floor structure 61.

The third guide pipe 91 is provided to penetrate the rear cross member 63 and the third rear mounting reinforcement member 67 along the front to rear direction of the vehicle body, and welded (e.g., CO2 welding or projection welding) to the rear cross member 63 and the third rear mounting reinforcement member 67.

The third pipe nut 93 may be a hollow cylinder shape. The third pipe nut 93 is connected to the front cross member upper 35 and the third front mounting reinforcement member 39 along the front to rear direction of the vehicle body at the rear of the front floor structure 31.

The third pipe nut 93 is provided to penetrate the front cross member upper 35 and the third front mounting reinforcement member 39 along the front to rear direction of the vehicle body at a position corresponding to the third guide pipe 91, and welded (e.g., CO2 welding or projection welding) to the front cross member upper 35 and the mounting reinforcement member 39.

The third engage bolt 95 is connected to the third guide pipe 91 along the front to rear direction of the vehicle body, and is engaged to the third pipe nut 93. The third engage bolt 95 may be connected to the third guide pipe 91 along the front to rear direction of the vehicle body through a third bolt passing hole 64 formed to the rear floor panel 65.

The third rubber bush 97 prevents noise caused by direct contact between the third guide pipe 91 and the third pipe nut 93 when the third engage bolt 95 is engaged to the third pipe nut 93 through the third guide pipe 91. The third rubber bush 97 is configured to absorb the coupling tolerance according to the front to rear direction of the vehicle body of the front floor structure 31 and the rear floor structure 61 which are engaged with each other by the third engage bolt 95.

The third rubber bush 97 is located between the third guide pipe 91 and the third pipe nut 93. The third rubber bush 97 includes a cylinder shape and is connected to the third pipe nut 93.

One portion of the third rubber bush 97 is engaged onto the third pipe nut 93, and the other portion of the third rubber bush 97 may be in contact with the third guide pipe 91.

Hereinafter, the assembly process and operation of the joint structure of a vehicle body 100 according to an exemplary embodiment are explained in detail referring to FIG. 1 to FIG. 7.

In an exemplary embodiment of the present disclosure, the under body 1 which is a chassis frame of a vehicle body is provided. The front body module 10 including the front side structure 11, the front roof structure 21, and the front floor structure 31 is provided. The rear body module 40 including the rear side structure 41, the rear roof structure 51, and the rear floor structure 61 is provided.

The front body module 10 and the rear body module 40 may form the upper body 3 of the vehicle body. The front body module 10 is connected along the vertical direction to the front portion of the under body 1 through the vehicle body mounting unit. The front body module 10 may be provided as the fixed portion 10*a* fixed to the front portion of the under body 1.

The rear body module 40 is the variable portion 40*a* that forms a rear cabin or luggage compartment at the rear of the vehicle body, and functions as the hailing type or delivery type upper body 3 together with the front body module 10. The rear body module 40 is connected along the vertical direction to the rear portion of the under body 1 through the vehicle body mounting unit.

The first guide pipe 71 of the plurality of engage units 70 is connected to the rear side reinforcement panel 45 and the first rear mounting reinforcement member 49 at the front of the rear side structure 41. The first pipe nut 73 of the plurality of engage units 70 is connected to the front side internal panel 13 and the first front mounting reinforcement member 19 at the rear of the front side structure 11. The first guide pipe 71 and the first pipe nut 73 are connected along the front to rear direction of the vehicle body with the first rubber bush 77 interposed therebetween.

The second guide pipe 81 of the plurality of engage units 70 is connected to the rear roof rail upper 55 and the second rear mounting reinforcement member 59 at the front of the rear roof structure 51. The second pipe nut 83 of the plurality of engage units 70 is connected to the front roof rail member 23 and the second front mounting reinforcement member 27 at the rear of the front roof structure 21. The second guide pipe 81 and the second pipe nut 83 are connected along the front to rear direction of the vehicle body with the second rubber bush 87 interposed therebetween.

The third guide pipe 91 of the plurality of engage units 70 is connected to the rear cross member 63 and the third rear mounting reinforcement member 67 at the front of the rear floor structure 61. The third pipe nut 93 of the plurality of engage units 70 is connected to the front cross member upper 35 and the third front mounting reinforcement member 39 at the rear of the front floor structure 31. The third guide pipe 91 and the third pipe nut 93 are connected along the front to rear direction of the vehicle body with the third rubber bush 97 interposed therebetween.

The first engage bolt 75 of the plurality of engage units 70 is connected to the first guide pipe 71 along the front to rear direction of the vehicle body through the first bolt passing hole 48 of the rear side internal panel 43, and is engaged to the first pipe nut 73.

The second engage bolt 85 of the plurality of engage units 70 is connected to the second guide pipe 81 along the front to rear direction of the vehicle body through the second bolt passing hole 56 of the rear roof rail lower 53, and is engaged with the second pipe nut 83.

The third engage bolt 95 of the plurality of engage units 70 is connected to the third guide pipe 91 along the front to rear direction of the vehicle body through the third bolt passing hole 64 of the rear floor panel 65, and is engaged to the third pipe nut 93.

Therefore, each of the front side structure 11, the front roof structure 21, and the front floor structure 31 of the front body module 10 may be connected to each of the rear side structure 41, the rear roof structure 51, and the rear floor structure 61 of the rear body module 40 through a plurality of engage units along the front to rear direction of the vehicle body.

The portion between the front side structure 11 of the front body module 10 and the rear side structure 41 of the rear body module 40 may be sealed through the first sealing member 16 and the second sealing member 46.

The portion between the front roof structure 21 of the front body module 10 and the rear roof structure 51 of the rear body module 40 may be sealed through the third sealing member 29 and the fourth sealing member 52.

The portion between the front floor structure 31 of the front body module 10 and the rear floor structure 61 of the rear body module 40 may be sealed through the fifth sealing member 32 and the sixth sealing member 69.

The first molding member MD1 is connected to the first molding mounting portions 17*a*, and 47*a* of the front side external panel 17 of the front side structure 11 and the rear side external panel 47 of the rear side structure 41 connected to each other. Accordingly, between the mutually engaged front side structure 11 and the rear side structure 41 may be sealed through the first molding member MD1.

Furthermore, the second molding member MD2 is connected to the second molding mounting portions 25*a*, and 57*a* of the front roof panel 25 of the front roof structure 21 and the rear roof panel 57 of the rear roof structure 51 which are connected to each other. Accordingly, between the front roof structure 21 and the rear roof structure 51 which are engaged with each other may be sealed through the second molding member MD2.

According to the joint structure of a vehicle body 100 according to an exemplary embodiment of the present disclosure, the front body module 10 as the fixed portion 10*a* connected to the front portion of the under body 1 maintains a connected state, and the rear body module 40 as the variable portion 40*a* may be selectively mounted to the rear portion of the under body 1 through the plurality of engage units 70.

Therefore, according to the joint structure of a vehicle body 100 of the exemplary embodiment of the present disclosure, depending on the type of customized service (e.g., use case) of the PBV, the rear body module 40 may be replaced so that the PBV may be used as a hailing type or delivery type vehicle.

Thus, by the joint structure of a vehicle body 100 according to an exemplary embodiment of the present disclosure, it is possible to reduce costs according to changing the upper body structure 3 of the vehicle body to suit various customized services of the PBV.

According to the joint structure of a vehicle body 100 according to an exemplary embodiment of the present disclosure, it is possible to seal between the front body module 10 and the rear body module 40 through the first sealing member 16, the second sealing member 46, the third sealing member 29, the fourth sealing member 52, the fifth sealing member 32, the sixth sealing member 69, the first molding member MD1, and the second molding member MD2. Thus, according to the joint structure of a vehicle body 100 according to an exemplary embodiment of the present disclosure, watertight performance of the PBV may be secured.

According to the joint structure of a vehicle body 100 according to an exemplary embodiment of the present disclosure, mounting strength and connection robustness of the front body module 10 and rear body module 40 may be secured through the first front mounting reinforcement member 19, the first rear mounting reinforcement member 49, the second front mounting reinforcement member 27, the second rear mounting reinforcement member 59, the third front mounting reinforcement member 39, and the third rear mounting reinforcement member 67.

According to the joint structure of a vehicle body 100 according to an exemplary embodiment of the present disclosure, the noise, vibration, and harshness (NVH) performance of the PBV may be secured, and the coupling tolerance according to the front to rear direction of the vehicle body of the front body module 10 and rear body module 40 may be absorbed through the first rubber bush 77, the second rubber bush 87, and the third rubber bush 97 of the plurality of engage units 70.

In an according to an exemplary embodiment of the present disclosure, the engage unit 70 detachably engages the front side structure 11 and the rear side structure 41 along the front to rear direction of the vehicle body.

In an according to an exemplary embodiment of the present disclosure, the engage unit 70 detachably engages the front roof structure 25 and the rear roof structure 57 along the front to rear direction of the vehicle body.

In an according to an exemplary embodiment of the present disclosure, the engage unit 70 detachably engages the front floor structure 31 and the rear floor structure 61 along the front to rear direction of the vehicle body.

Figure 8:
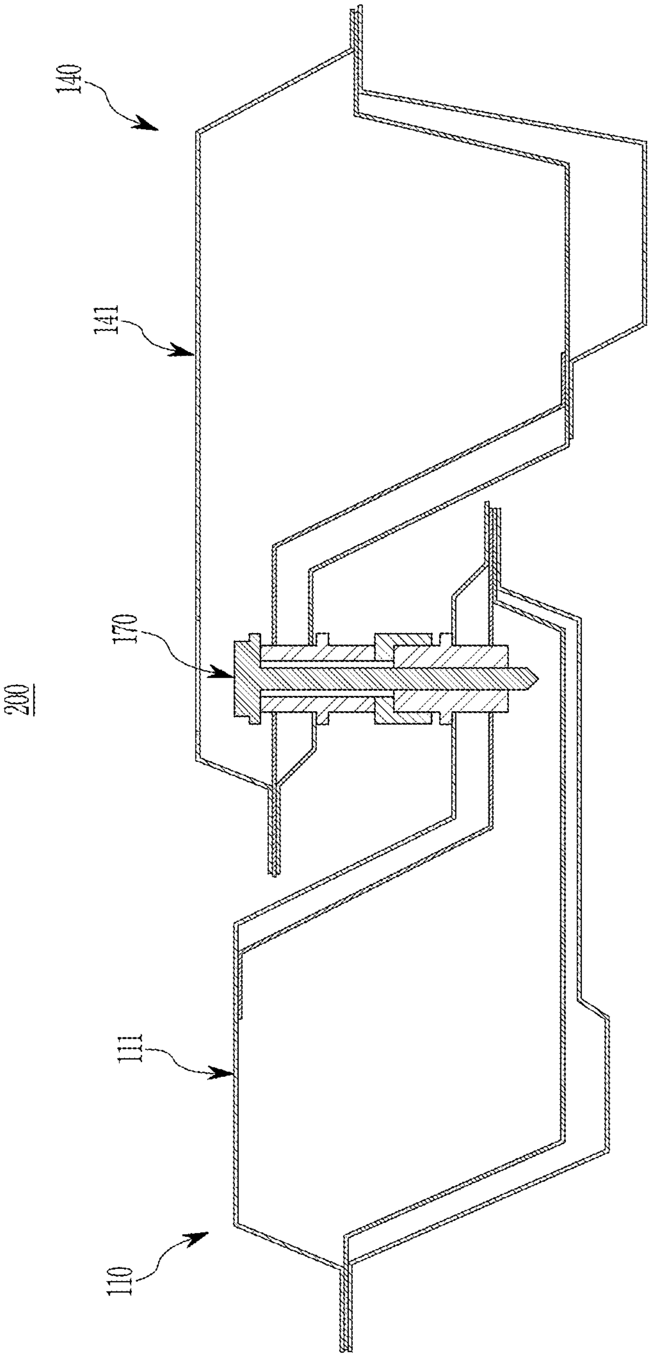
FIG. 8 and FIG. 9 is a drawing showing exemplary variation of a joint structure of a vehicle body according to an exemplary embodiment of the present disclosure.
Figure 9:
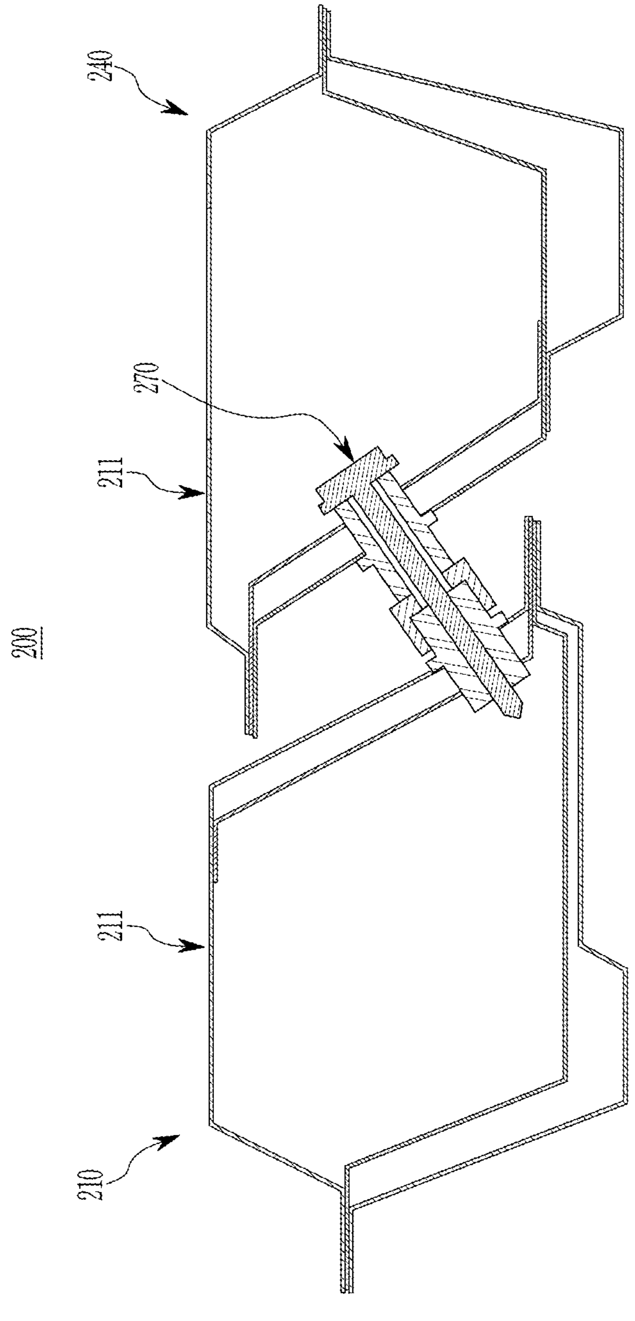

FIG. 8 and FIG. 9 is a drawing showing exemplary variation of a joint structure of a vehicle body according to an exemplary embodiment of the present disclosure.

Referring to FIG. 8, according to a first exemplary variation of the joint structure of a vehicle body 200 according to an exemplary embodiment of the present disclosure, a plurality of engage units 170 may engage a front side structure 111 of a front body module 110 and a rear side structure 141 of a rear body module 140 in a horizontal direction along the vehicle width direction.

Referring to FIG. 9, according to a second exemplary variation of the joint structure of a vehicle body 300 according to an exemplary embodiment of the present disclosure, a plurality of engage units 270 may engage a front side structure 211 of a front body module 210 and a rear side structure 241 of a rear body module 240 in an oblique direction along the vehicle width direction.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, a singular expression includes the plural form unless the context clearly dictates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A joint structure of a vehicle body, the joint structure comprising:

a front body module connected to a front portion of an under body in the vehicle body;

a rear body module connected to a rear portion of the under body in the vehicle body; and an engage unit that detachably engages the front body module and the rear body module.

2. The joint structure of claim 1, wherein the front body module includes a front roof structure, a front floor structure and a front side structure to which the front roof structure and the front floor structure are connected, and wherein the rear body module includes a rear roof structure, a rear floor structure and a rear side structure to which the rear roof structure and the rear floor structure are connected.

3. The joint structure of claim 2, wherein the engage unit detachably engages the front side structure and the rear side structure along the front to rear direction of the vehicle body, wherein the engage unit detachably engages the front roof structure and the rear roof structure along the front to rear direction of the vehicle body, and wherein the engage unit detachably engages the front floor structure and the rear floor structure along the front to rear direction of the vehicle body.

4. The joint structure of claim 2, wherein the front side structure includes a front side internal panel, a front side reinforcement panel, a front side external panel, and a first front mounting reinforcement member connected between the front side internal panel and the front side reinforcement panel, and wherein the rear side structure includes a rear side internal panel, a rear side reinforcement panel, a rear side external panel, and a first rear mounting reinforcement member connected between the rear side internal panel and the rear side reinforcement panel.

5. The joint structure of claim 4, wherein the engage unit includes:

a first guide pipe connected to the rear side reinforcement panel and the first rear mounting reinforcement member along the front to rear direction of the vehicle body;

a first pipe nut connected to the front side internal panel and the first front mounting reinforcement member along the front to rear direction of the vehicle body; and a first engage bolt connected to the first guide pipe along the front to rear direction of the vehicle body, and engaged to the first pipe nut.

6. The joint structure of claim 5, wherein the engage unit further includes:

a first rubber bush located between the first guide pipe and the first pipe nut.

7. The joint structure of claim 4, further including:

a first sealing member connected to a rear connection portion to which the front side internal panel, the front side reinforcement panel, the front side external panel, and the first front mounting reinforcement member are connected to each other; and a second sealing member connected to a front connection portion to which the rear side internal panel, the rear side reinforcement panel, and the first rear mounting reinforcement member are connected to each other.

8. The joint structure of claim 4, wherein first molding mounting portions are formed along a vertical direction on the front side external panel and the rear side external panel connected along the front to rear direction of the vehicle body, and wherein a first molding member configured to seal between the front side structure and the rear side structure is connected to the first molding mounting portions.

9. The joint structure of claim 2, wherein the front roof structure includes a front roof rail member and a front roof panel connected to each other, and a second front mounting reinforcement member connected to the front roof rail member, and wherein the rear roof structure includes a rear roof rail lower, a rear roof rail upper, and a rear roof panel connected to each other, and a second rear mounting reinforcement member connected between the rear roof rail lower and the rear roof rail upper.

10. The joint structure of claim 9, wherein the engage unit includes:

a second guide pipe connected to the rear roof rail upper and the second rear mounting reinforcement member along the front to rear direction of the vehicle body;

a second pipe nut connected to the front roof rail member and the second front mounting reinforcement member along the front to rear direction of the vehicle body; and a second engage bolt connected to the second guide pipe and engaged with the second pipe nut.

11. The joint structure of claim 10, wherein the engage unit further includes:

a second rubber bush located between the second guide pipe and the second pipe nut.

12. The joint structure of claim 9, further including:

a third sealing member connected to a rear connection portion to which the front roof rail member and the front roof panel are connected to each other; and a fourth sealing member connected to a front connection portion, to which the rear roof rail lower, the rear roof rail upper, and the second rear mounting reinforcement member are connected to each other.

13. The joint structure of claim 9, wherein second molding mounting portions are formed on the front roof panel and the rear roof panel connected along the front to rear direction of the vehicle body, and wherein a second molding member configured to seal between the front roof structure and the rear roof structure is connected to the second molding mounting portions.

14. The joint structure of claim 2, wherein the front floor structure includes a front cross member lower, a front cross member upper, a front floor panel, and a third front mounting reinforcement member connected between the front cross member lower and the front cross member upper, and wherein the rear floor structure includes a rear cross member, a rear floor panel, and a third rear mounting reinforcement member connected between the rear cross member and the rear floor panel.

15. The joint structure of claim 14, wherein the engage unit includes:

a third guide pipe connected to the rear cross member and the third rear mounting reinforcement member along the front to rear direction of the vehicle body;

a third pipe nut connected to the front cross member upper and the third front mounting reinforcement member along the front to rear direction of the vehicle body; and a third engage bolt connected to the third guide pipe and engaged with the third pipe nut.

16. The joint structure of claim 15, wherein the engage unit further includes:

a third rubber bush located between the third guide pipe and the third pipe nut.

17. The joint structure of claim 14, wherein a fifth sealing member is connected to a rear connection portion to which the front cross member lower, the front cross member upper, and the third front mounting reinforcement member are connected to each other, and wherein a sixth sealing member is connected to a front connection portion to which the rear cross member, the rear floor panel, and the third rear mounting reinforcement member are connected to each other.

18. The joint structure of claim 2, wherein the engage unit engages the front side structure and the rear side structure in a horizontal direction along a vehicle width direction.

19. The joint structure of claim 2, wherein the engage unit engages the front side structure and the rear side structure in an oblique direction along a vehicle width direction.

20. The joint structure of claim 1, wherein the front body module is a fixed portion fixed to the front portion of the under body, and wherein the rear body module includes a predetermined shape and is a detachable variable portion to the rear portion of the under body and the front body module.

* * * * *